United States Patent Office 3,370,072
Patented Feb. 20, 1968

3,370,072
17α-DIHALOMETHYL CORTICOIDS AND PROCESS
FOR THEIR PREPARATION
John H. Fried, Palo Alto, Calif., assignor to Syntex Corporation, Panama, Panama, a corporation of Panama
No Drawing. Filed Jan. 18, 1966, Ser. No. 521,450
15 Claims. (Cl. 260—397.45)

ABSTRACT OF THE DISCLOSURE

As novel compounds, 17α-dihalomethyl steroids of the pregnane series containing optional substitution at one or more of positions C-3, C-6, C-6,7, C-9, C-11, C-16, and C-21 of the steroid nucleus and/or unsaturation between carbon atom C-4,5,C-1,2 and/or C-6,7 which compounds are anti-inflammatory and corticoid agents and processes for the preparation of such compounds.

This invention is directed at novel cyclopentanopolyhydrophenanthrene derivatives and at processes for their preparation. Specifically, this invention is directed at 17α-dihalomethyl pregnenes of the formula:

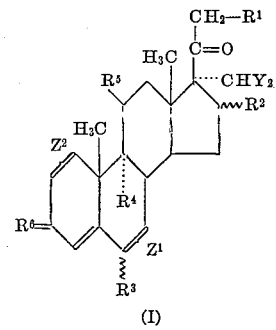

(I)

wherein:

$R^1$ is hydroxy, a hydrocarbon carboxylic acyloxy group of less than 12 carbon atoms, fluoro, phosphato or tetrahydropyranyloxy;
$R^2$ is hydrogen or methyl;
$R^3$ is hydrogen, chloro, fluoro or methyl;
$R^4$ is hydrogen or fluoro;
$R^5$ is β-hydroxy or keto;
$R^6$ is an oxygen atom or the group

in which
$R^7$ is hydrogen, tetrahydropyranyl or a hydrocarbon carboxylic acyl group of less than 12 carbon atoms;
Y is chloro or fluoro;
$Z^1$ is a carbon-carbon double bond, a carbon-carbon single bond or the difluoromethylene group

and
$Z^2$ is a carbon-carbon single bond or a carbon-carbon double bond, $Z^2$ being a carbon-carbon single bond when $R^6$ is other than an oxygen atom.

The hydrocarbon carboxylic acyl and acyloxy groups in the compounds of the present invention will contain less than 12 carbon atoms and may be of a straight, branched, cyclic or cycloc-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The foregoing compounds are anti-inflammatory and corticoid agents and are accordingly useful in the treatment of various inflammatory conditions such as allergies, contact dermatitis, arthritis, and the like. They may be administered in the usual pharmaceutical compositions at dosages appropriate for the condition being treated.

The preparation of these novel derivatives utilizes, in whole or in part, the following general reaction scheme:

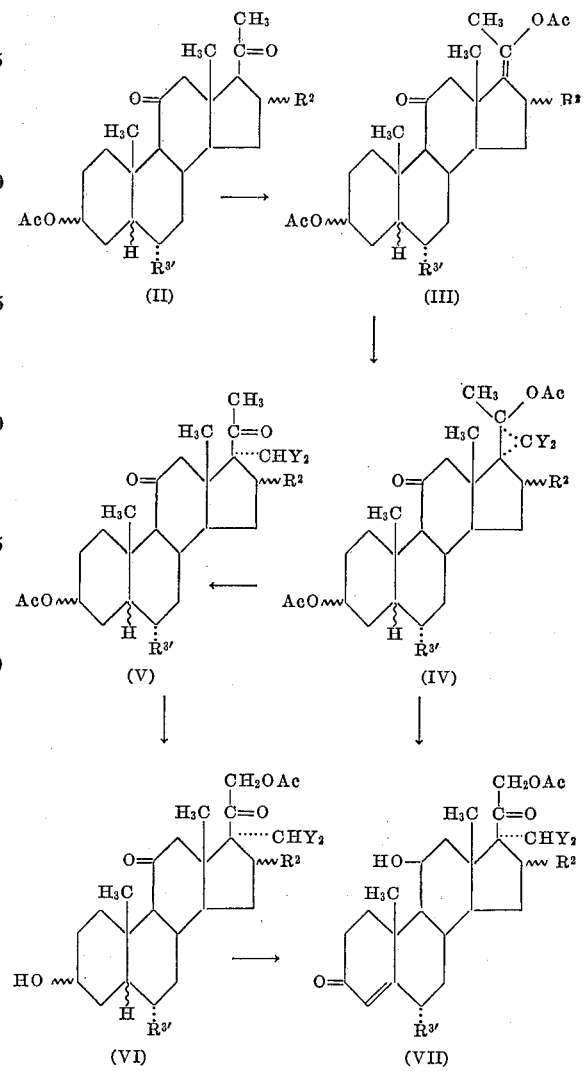

In the foregoing transformation, in which $R^{3'}$ is hydrogen or methyl, a 3 - acyloxy - 11,20-diketopregnane (II) which may be optionally substituted with a methyl group in the 16α or 16β-position is treated with acetic anhydride in the presence of an acid catalyst such as p-toluenesulfonic acid. The resultant 20 - acetoxypregn-17(20)-ene of Formula (III) is then subjected to the action of a reagent capable of generating a dihalomethylene radical such as, for example, sodium chlorodifluoroacetate or sodium trichloroacetate in refluxing diethyleneglycol dimethyl ether or triethyleneglycol dimethyl ether; a combination of trimethyl(trifluoromethyl)tin, phenyl(trichloromethyl)mercury or phenyl(bromodichloromethyl)mercury and sodium iodide; and the like. There is thus obtained the corresponding 3 - acyloxy - 11 - keto- 17α,20-dihalomethylene - 20 - acetoxypregnane of Formula IV which upon treatment with an acidic agent such as boron trifluoride and hydrogen chloride in glacial acetic acid or perchloric acid in methanol undergoes hydrolytic ring opening to generate a 3 - acyloxy - 11-keto-17α - dihalomethyl - 20 - ketopregnane of Formula V. Hydrolysis of this product, as with potassium bicarbonate in methanol, then yields the corresponding 3-hydroxy derivative. Elaboration at C-21 next follows through α-bromination as with bromine in dioxane. Subsequent treatment of the resulting 21-bromo compound with potassium acetate then yields the 21-acetoxy derivative (VI). The 3-hydroxy group is then oxidized, as with chromic oxide in pyridine, to yield a 3,11,20-triketo-17α - dihalomethyl - 21 - acetoxypregnane. Introduction of a $\Delta^4$ double bond is accomplished in the conventional manner through α-bromination and subsequent dehydrobromination, as with lithium chloride or calcium carbonate, to yield the 3,11,20 - triketo - 17α - dihalomethyl - 21 - acetoxypregn-4-ene. In the case of 5α-pregnanes, the foregoing bromination and dehydrobromination is effected with initial treatment with bromine and sodium iodide followed by treatment with collidine. Conversion of the 11-keto group to an 11β-hydroxy substituent is effected by initial formation of the 3,20-bis semicarbazone, reduction of the 11-keto group as with sodium borohydride, and regeneration of the 3,20-diketo system with pyruvic acid (VII).

Compounds of Formula II wherein $R^{3'}$ is methyl are obtained from a 3-hydroxypregn-5-one-11,20-dione via conventional procedures. Thus, after protection of the 20-keto group through formation of an ethylene ketal, the $\Delta^5$ double bond is epoxidized as with monoperphthalic acid in chloroform. The resulting 5α,6α-oxido derivative is then treated with methylmagnesium bromide to yield the corresponding 3,5α-dihydroxy-6β-methyl compound which is oxidized with chromic trioxide in pyridine and then subjected to the action of base such as sodium hydroxide to furnish the corresponding 6α-methyl-20,20-ethylenedioxypregn-4-ene-3,11-dione. This compound is then catalytically reduced as with hydrogen and palladium to yield the corresponding 5β-pregnane. Treatment with sodium borohydride for about 30 minutes then yields the 3α - hydroxy-6α-methyl-20,20-ethylenedioxypregnan-11-one which is treated with acid to regenerate the 20-keto group and is converted to the 3α-acetoxy starting material with acetic anhydride in pyridine.

The 21-acetoxy derivative (VII) may be hydrolyzed under conventional basic techniques to yield the free 21-hydroxy compound. This in turn may be acylated as with an acid anhydride in pyridine or etherified as with dihydropyran and p-toluenesulfonic acid, thereby forming the 21-tetrahydropyranyloxy derivative.

The 21-hydroxy compound is converted via conventional procedures to the corresponding 21-iodo compound, e.g., through formation of the 21-mesylate and treatment of this with sodium iodide. The 21-iodo derivative in turn is treated with silver phosphate to yield the 21-phosphato derivative which may be titrated with base to yield salts thereof. Alternatively, treatment of the 21-iodo intermediate with silver fluoride yields the corresponding 21-fluoro compound. The foregoing conversions may be executed at this stage or at a later stage, as more fully exemplified hereafter.

Introduction of a 9α-fluoro substituent is performed in the usual manner. Thus, an 11β-hydroxy compounds is dehydrated to yield the $\Delta^{9(11)}$-ene. This is converted to the 9β,11β-oxido compound through the bromohydrin intermediate. Treatment of the oxide with hydrogen fluoride then yields the 9α-fluoro-11β-hydroxy derivative.

Introduction of a 6α-chloro or 6α-fluoro substituent in a 3-keto-$\Delta^4$-ene such as that of Formula VII wherein $R^{3'}$ is hydrogen is accomplished through initial formation of the enol ether, as by the action of ethyl orthoformate and p-toluenesulfonic acid, followed by treatment with N-chlorosuccinimide or perchloryl fluoride respectively, with acid isomerization of any 6β-halo component formed.

The 3-keto-$\Delta^{1,4}$-dienes of the present invention are obtained from the corresponding 3-keto-$\Delta^4$-enes via conventional techniques such as through the action of 2,3-dichloro-5,6-dicyanobenzoquinone or selenium dioxide. Likewise, the 3-keto-$\Delta^{4,6}$-dienes may be converted to the corresponding 3-keto-$\Delta^{1,4,6}$-trienes in a known manner, e.g., by the action of chloranil in n-amyl alcohol.

The 3-keto-$\Delta^{4,6}$-dienes of the present invention are obtained from the corresponding 3-keto-$\Delta^4$-ene via the action of chloranil or from its enol ether through the action of 2,3-dichloro-5,6-dicyanobenzoquinone. These may in turn be treated with sodium chlorodifluoroacetate (or with other difluoromethylene-forming reagents in the manner described above) to yield the 3-keto-6,7-difluoromethylene-$\Delta^4$-ene derivatives. Preferably during this reaction, a 21-hydroxy group is protected as through formation of a 21-tetrahydropyranyloxy group, with regeneration of the hydroxy group, if desired, being effected by brief treatment with acid.

The 3-keto-$\Delta^4$ derivatives of the present invention may be converted to the corresponding 3β-hydroxy-$\Delta^4$-enes through reduction, as with sodium borohydride, lithium aluminum hydride, or the like, and the resultant 3β-hydroxy derivatives in turn may be esterified as, for example, through the use of acetic anhydride pyridine, or etherified through the action of dihydropyran and an acid catalyst such as p-toluenesulfonyl chloride, dinitrobenzenesulfonyl chloride, or the like.

The following examples will serve to further typify the nature of this invention, but being presented solely for the purpose of illustration, they should not be construed as a limitation thereof.

*Example 1*

Approximately 2 ml. of solvent are removed by distillation over a 30-minute period from a mixture of 1.2 g. of 3α-acetoxypregnane-11,20-dione, 20 ml. of acetic anhydride and .06 g. of p-toluenesulfonic acid. The mixture is then refluxed for 24 hours, cooled and diluted with ethyl acetate. The organic solution is then washed with water, aqueous sodium bicarbonate and again with water until neutral, dried over sodium sulfate and evaporated to dryness to yield 3α,20-diacetoxypregn-17-en-11-one which may be recrystallized from methylene chloride:hexane.

To a stirred and refluxing solution of 1 g. of 3α,20-diacetoxypregn-17-en-11-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, the mixture is filtered and evaporated in vacuo to dryness. The residue is chromatographed on alumina, eluting with methylene chloride, to yield 3α,20-diacetoxy-17α,20-difluoromethylenepregnan-11-one.

A solution of 1 g. of 3α,20-diacetoxy-17α,20-difluoromethylenepregnan-11-one in 30 ml. of absolute ethanol and 0.25 ml. of 70% perchloric acid is allowed to stand at 25° C. for 48 hours. At the end of this time, the reaction mixture is diluted with water and filtered. The solid thus collected is chromatographed on Florisil absorbent to yield 3α-acetoxy-17α-difluoromethylpregnane-11,20-dione.

One gram of 3α-acetoxy-17α-difluoromethylpregnane-11,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-difluoromethyl - 3α - hydroxypregnane-11,20-dione which is collected by filtration and recrystallized from acetone:hexane.

A solution of 6 g. of 17α-difluoromethyl-3α-hydroxypregnane-11,20-dione in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-difluoromethylpregnane-3,11,20-trione which may be further purified by recrystallization from acetone:hexane.

To a stirred solution of 1 g. of 17α - difluoromethylpregnane-3,11,20-trione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms, and this material is then collected by filtration, washed with cold 1:1 water:dimethylformamide and then water and dried to yield 17α - difluoromethylpregn - 4 - ene - 3,11,20 - trione which is further purified through recrystallization from acetone with charcoal decolorization as necessary.

To a suspension of 1 g. of 17α-difluoromethylpregn-4-ene-3,11,20-trione in 27 ml. of methanol and 1 ml. of water, under nitrogen, is added 1.4 g. of semicarbazide hydrochloride and 0.74 of sodium bicarbonate. The mixture is heated at reflux for three hours and then at 45° C. for 20 hours. The suspension is cooled and 36 ml. of water are slowly added to it. The solid is collected by filtration, washed with water and dried to yield 3,20-bis semicarbazone - 17α - difluoromethylpregn - 4 - en - 11-one which is recrystallized from pyridine:methanol.

A solution of 1 g. of sodium borohydride in 3 ml. of water is added to an ice-cooled solution of 1 g. of 3,20-bis semicarbazone - 17α - difluoromethylpregn - 4 - en-11-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3,20-bis semicarbazone - 17α - difluoromethylpregn - 4 - en - 11β - ol which may be further purified by recrystallization from acetone: hexane.

A suspension of 1 g. of 3,20-bis semicarbazone-17α-difluoromethylpregn-4-en-11β-ol in 20 ml. of pyridine and 7.5 ml. of acetic anhydride is heated at steam bath temperatures for three hours. The mixture is then poured into 120 ml. of ice water and the pyridine neutralized through the addition of hydrochloric acid. This mixture is extracted with methylene chloride and these extracts are washed with water to neutrality, dried and evaporated to dryness. The residue thus obtained is chromatographed on Florisil absorbent to yield 11β-hydroxy-17α-difluoromethylpregn-4-ene-3,20-dione which may be further purified through recrystallization from acetone:hexane.

To a stirred cooled solution of 4 g. of 11β-hydroxy-17α-difluoromethylpregn-4-ene-3,20-dione in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice water containing 18 ml. of acetic acid and 2 g. of sodium thiosulfate. After stirring for 15 minutes, the solution is decanted and the solid collected by filtration to yield 11β-hydroxy-17α-difluoromethyl-21-iodopregn-4-ene-3,20-dione. This compound is mixed with 80 ml. of acetone and 12 g. of recently fused potassium acetate. This mixture is refluxed for eight hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 11β - hydroxy - 17α - difluoromethyl - 21 - acetoxypregn-4-ene-3,20-dione.

Similarly, from 3α - acetoxy - 16α - methylpregnane-11,20 - dione and 3α - acetoxy - 16β - methylpregnane-11,20-dione there are respectively obtained according to the foregoing procedure, 11β - hydroxy - 16α - methyl-17α - difluoromethyl - 21 - acetoxypregn - 4 - ene - 3,20-dione and 11β - hydroxy - 16β - methyl - 17α - difluoromethyl - 21 - acetoxypregn - 4 - ene - 3,20 - dione.

One gram of 11β - hydroxy - 17α - difluoromethyl - 21-acetoxy - pregn - 4 - ene - 3,20 - dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 11β,21 - dihydroxy - 17α - difluoromethylpregn - 4 - ene - 3,20 - dione which is collected by filtration and recrystallization from acetone:hexane.

Utilization of this hydrolysis procedure with the other 21-acetoxy derivatives described above yield 11β,21 - dihydroxy - 16α - methyl - 17α - difluoromethylpregn - 4-ene - 3,20 - dione and 11β,21 - dihydroxy - 16β - methyl-17α-difluoromethylpregn-4-ene-3,20-dione.

*Example 2*

To a stirring and refluxing solution of 1 g. of 3α,20-diacetoxypregn-17-en-11-one is 10 ml. of dimethyl triethylene-glycol ether is added in a dropwise fashion over a two-hour period and under nitrogen, 30 equivalents of a 50% w./v. solution of sodium trichloroacetate. The solution is then cooled and filtered and the filtrate is evaporated to dryness under reduced pressure. The residue thus obtained is chromatographed on alumina, eluting with methylene chloride, to yield 3α,20-diacetoxy-17α,20-dichloromethylenepregnan-11-one.

A solution of 1 g. of 3α,20-diacetoxy-17α,20-dichloromethylenepregnan-11-one in 30 ml. of absolute ethanol and 0.25 ml. of 70% perchloric acid is allowed to stand at 25° C. for 48 hours. At the end of this time, the mixture is diluted with water and filtered. Upon chromatography on Florisil absorbent there is obtained 3β-acetoxy - 17α - difluoromethylpregnane - 11,20 - dione.

Upon substituting this compound for 3α-acetoxy-17α-difluoromethylpregnane - 11,20 - dione in the procedure described in Example 1, there is obtained 11β-hydroxy - 17α - dichloromethyl - 21 - acetoxypregn - 4-ene-3,20-dione. Upon subjecting this derivative to the hydrolysis procedure described in Example 1, there is obtained 11β,21 - dihydroxy - dichloromethylpregn - 4 - ene-3,20-dione.

*Example 3*

One gram of 11β - hydroxy - 17α - difluoromethyl - 21-acetoxy-pregn-4-ene-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield 17α-difluoromethyl - 21 - acetoxypregna - 4,9(11) - diene- 3,20-dione which may be further purified through recrystallization from acetone:hexane.

Twenty-eight grams of N-bromoacetamide are added over a one hour period with stirring, in the dark and at room temperature, to a mixture of 50 g. of 17α-difluoromethyl-21-acetoxypregna-4,9(11)-diene-3,20 - dione, 500 ml. of pure dioxane and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled, and almost all of the acetone is removed by distillation. Iced water is then added and the solid which forms is collected by filtration, washed with water and dried to yield 9β,11β-oxido-17α-difluoromethyl-21-acetoxypregn-4 - ene - 3,20 - dione which may be further purified through recrystallization from methylene chloride:benzene.

To a stirred solution of 1.8 g. of 9β,11β-oxido-17α-difluoromethyl-21-acetoxypregn-4-ene-3,20-dione in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and is then cooled and the solid which forms is collected by filtration to yield 9α-fluoro-11β-hydroxy-17α - difluoromethyl - 21-acetoxypregn-4-ene-3,20-dione.

In a similar fashion there is obtained 9α-fluoro-11β-hydroxy-16α-methyl - 17α - difluoromethyl - 21 - acetoxypregn-4-ene-3,20-dione, 9α-fluoro - 11β - hydroxy - 16β-methyl-17α-difluoromethyl-21-acetoxypregn-4 - ene - 3,20-dione and 9α-fluoro-11β-hydroxy-17α-dichloromethyl-21-acetoxypregn-4-ene-3,20-dione.

*Example 4*

To a suspension of 1 g. of 11β-hydroxy-17α-difluoromethyl-21-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-11β-hydroxy-17α - difluoromethyl - 21-acetoxypregna-3,5-dien-20-one which is recrystallized from acetone:hexane.

A mixture of 5 g. of 3-ethoxy-11β-hydroxy-17α-difluoromethyl-21-acetoxypregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-11β-hydroxy-17α-difluoromethyl - 21 - acetoxypregn - 4-ene-3,20-dione which is recrystallized from acetone. The corresponding 6α-chloro compound is obtained by dissolving this compound in glacial acetic acid and introducing a slow stream of anhydrous hydrogen chloride over a period of four hours and at a temperature of 15° C. The solid which forms upon pouring this mixture into water is collected by filtration, washed with water and dried to yield 6α-chloro-11β-hydroxy - 17α - difluoromethyl - 21-acetoxypregn-4-ene - 3,20 - dione which is recrystallized from acetone:hexane.

6α-chloro-11β-hydroxy-16α-methyl-17α-difluoromethyl-21-acetoxyprgen-4-ene-3,20-dione;
6α-chloro-11β-hydroxy-16β-methyl-17α-difluoromethyl-21-acetoxypregn-4-ene-3,20-dione;
6α-chloro-9α-fluoro-11β-hydroxy-17α-difluoromethyl-21-acetoxypregn-4-ene-3,20-dione;
6α-chloro-9α-fluoro-11β-hydroxy-16αmethyl-17α-difluoromethyl-21-acetoxypregn-4-ene-3,20-dione; and
6αchloro-9α-fluoro-11β-hydroxy-16β-methyl-17α-difluoromethyl-21-acetoxypregn-4-ene-3,20-dione are obtained from the appropriate starting material in a fashion analogous to that described in this example.

By subjecting 6α-chloro-11βhydroxy-17α-difluoromethyl-21-acetoxypregn-4-ene-3,20-dione to the alkaline hydrolysis procedure described in the last paragraph of Example 1, there is obtained 6α-chloro-11β,21-dihydroxy-17α-difluoromethylpregn-4-ene-3,20-dione. The following compounds are similarly obtained from their 21-acetates:

6α-chloro-11β,21-dihydroxy-16α-methyl-17α-difluoromethylpregn-4-ene-3,20-dione;
6α-chloro-11β,21-dihydroxy-16β-methyl-difluoromethylpregn-4-ene-3,20-dione;
6α-chloro-9α-fluoro-11β,21-dihydroxy-17α-difluoromethylpregn-4-ene-3,20-dione;
6α-chloro-9α-fluoro-11β,21-dihydroxy-16α-methyl-17α-difluoromethylpregn-4-ene-3,20-dione; and
6α-chloro-9α-chloro-9α-fluoro-11β,21-dihydroxy-16β-methyl-17α-difluoromethylpregn-4-ene-3,20-dione.

*Example 5*

A stream of perchloryl fluoride is passed through a solution of 1 g. of 3-ethoxy-11β-hydroxy-17α-difluoromethyl-21-acetoxypregna-3,5-dien-20-one in 25 ml. of dimethylformamide, cooled to 0° C., for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid, and through this solution is passed a stream of dry hydrogen chloride for a period of 24 hours at a temperature of 15° C. The mixture is poured into cold water and the solid which forms is collected by filtration, washed with water and dried to yield 6α-fluoro-11β-hydroxy-17α-difluoromethyl-21-acetoxypregn-4-ene-3,20-dione which is recrystallized from acetone:hexane.

Likewise, the various other enol ethers prepared in the course of synthesizing the 6α-chloro derivatives described in Example 4 are subjected to the procedure of this example to yield the corresponding 6α-fluoro derivatives as their 21-acetates. Upon hydrolyzing 6α-fluoro-11β-hydroxy-17α-difluoromethyl-21-acetoxypregn-4 - ene - 3,20-dione and these 6α-fluoro-21-acetates with potassium bicarbonate as previously described, there are respectively obtained:

6α-fluoro-11β,21-dihydroxy-17α-difluoromethylpregn-4-ene-3,20-dione;
6α-fluoro-11β,21-dihydroxy-16α-methyl-17α-difluoromethylpregn-4-ene-3,20-dione;

6α-fluoro-11β,21-dihydroxy-16β-methyl-17α-difluoro-
methylpregn-4-ene-3,20-dione;
6α,9α-difluoro-11β,21-dihydroxy-17α-difluoromethyl-
pregn-4-ene-3,20-dione;
6α,9α-difluoro-11β,21-dihydroxy-16α-methyl-17α-difluoro-
methylpregn-4-ene-3,20-dione; and
6α,9αdifluoro-11β,21-dihydroxy-16β-methyl-17α-difluoro-
methylpregn-4-ene-3,20-dione.

*Example 6*

A mixture of 1 g. of 3β-acetoxypregn-5-ene-11,20-dione, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3β-acetoxy-20,20-ethylenedioxypregn-5-en-11-one which is recrystallized from acetone:hexane.

A solution of 2.5 g. of 3β-acetoxy-20,20-ethylenedioxypregn-5-en-11-one in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3β-acetoxy-5α,6α-oxido-20,20-ethylenedioxypregnan-11-one which may be further purified by recrystallization from acetone:hexane.

To a stirred solution of 20 ml. of 4 N methylmagnesium bromide in ether is added a solution of 1 g. of 3β-acetoxy-5α,6α-oxido-20,20-ethylenedioxypregnan-11-one in 30 ml. of dry tetrahydrofuran, and the stirred mixture is heated at reflux temperatures for 30 minutes. The reflux condenser is then replaced by a calcium chloride drying tube and the ether is allowed to escape. When the internal temperature is 54° C., the condenser is returned and the mixture refluxed for an additional four-hour period. Two hundred milliliters of a saturated ammonium chloride solution are then slowly added to the cooled mixture which is then stirred for 15 minutes and extracted with ethyl acetate. These extracts are washed with water, dried over sodium sulfate and evaporated to dryness to yield 3β,5α-dihydroxy-6β-methyl-20,20-ethylenedioxypregnan-11-one which is recrystallized from aqueous methanol.

A solution of 6 g. of 3β,5α-dihydroxy-6β-methyl-20,20-ethylenedioxypregnan-11-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 5α-hydroxy-6β-methyl-20,20-ethylenedioxypregnane-3,11-dione which may be further purified by recrystallization from acetone:hexane.

A solution of 1 g. of 5α-hydroxy-6β-methyl-20,20-ethylenedioxypregnane-3,11-dione in 100 ml. of methanol and 50 ml. of 1 N aqueous sodium hydroxide is allowed to stand at room temperature under nitrogen for 24 hours. The solution is then concentrated under reduced pressure and without heating to half its volume and diluted with ice water. The solid which forms is collected by filtration, washed with water and dried to yield 6α-methyl-20,20-ethylenedioxypregn-4-ene-3,11-dione which may be further purified through recrystallization from acetone:hexane.

A suspension of 0.5 g. of 5% palladium-on-carbon catalyst in 50 ml. of methanol is hydrogenated for 30 minutes. A solution of 2 g. of 6α-methyl-20,20-ethylenedioxypregn-4-ene-3,11-dione in 200 ml. of methanol is added and hydrogenated with agitation until the uptake of hydrogen has ceased. The catalyst is removed by filtration and the solution was evaporated to yield 6α-methyl-20,20-ethylenedioxy-5β-pregnane-3,11-dione which is recrystallized from methylene chloride:hexane for further purification.

A solution of 1 g. of sodium borohydride in 3 ml. of water is added to an ice-cooled solution of 1 g. of 6α-methyl-20,20-ethylenedioxy-5β-pregnane-3,11-dione in 120 ml. of methanol and the mixture then allowed to stand for 30 minutes at room temperature. The excess reagent is decomposed by addition of acetic acid and the solution is then concentrated to small volume in vacuo and diluted with water. The product is extracted with ethyl acetate and these extracts are washed with water, dried and evaporated to yield 3α-hydroxy-6α-methyl-20,20-ethylenedioxy-5β-pregnan-11-one which may be further purified by recrystallization from acetone:hexane.

A mixture of 0.5 g. of 3α-hydroxy-6α-methyl-20,20-ethylenedioxy-5β-pregnan-11-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evapoarted to dryness. The residue is triturated with ether to yield 3α-hydroxy-6α-methylpregnane-11,20-dione which is recrystallized from acetone:hexane.

A mixture of 1 g. of 3α-hydroxy-6α-methylpregnane-11,20-dione, 4 ml. of pyridine and 2 ml. of acetic anhydride is allowed to stand at room temperature for 15 hours. The mixture is then poured into ice water and the solid which forms is collected by filtration, washed with water and dried to yield 3α-acetoxy-6α-methylpregnane-11,20-dione which may be further purified through recrystallization from acetone:hexane.

By substituting 3α-acetoxy-6α-methylpregnane-11,20-dione for 3α-acetoxypregnane-11,20-dione in the procedure of Example 1, there is obtained upon completion of the steps therein described, 6α-methyl-11β,21dihydroxy-17α-difluoromethylpregn-4-ene-3,20-dione.

Subjecting this 6α-methyl compound, as its 21-acetate, to the procedures of Example 3 yields 6α-methyl-9α-fluoro-11β-hydroxy-17α-difluoromethyl-21-acetoxypregn-4-ene-3,20-dione which may be hydrolyzed with potassium bicarbonate as previously described to yield the corresponding free 21-hydroxy compound.

*Example 7*

To a suspension of 1 g. of 6α-chloro-11β-hydroxy-17α-difluoromethyl-21-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and is allowed to stand at room temperature for 30 minutes. There is then added 0.8 ml. of pyridine, followed by water until solidification occurs. This solid is collected by filtration, washed with water and air dried to yield 3-ethoxy-6-chloro-11β-hydroxy-17α-difluoromethyl-21-acetoxypregna-3,5-dien-20-one which is recrystallized from acetone:hexane.

To a solution of 1 g. of 3-ethoxy-6-chloro-11β-hydroxy-17α-difluoromethyl-21-acetoxypregna-3,5-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-chloro-11β-hydroxy-17α-difluoromethyl-21-acetoxypregna-4,6-diene-3,20-dione which may be further purified through recrystallization from acetone:hexane.

In a similar manner, the following compounds are produced:

11β-hydroxy-17α-difluoromethyl-21-acetoxypregna-4,6-diene-3,20-dione;
11β-hydroxy-16α-methyl-17α-difluoromethyl-21-acetoxypregna-4,6-diene-3,20-dione;

11β - hydroxy - 16β - methyl-17α-difluoromethyl-21-acetoxypregna-4,6-diene-3,20-dione;
6 - chloro - 11β-hydroxy-16α-methyl-17α-difluoromethyl-21-acetoxypregna-4,6-diene-3,20-dione;
6 - chloro - 11β-hydroxy-16β-methyl-17α-difluoromethyl-21-acetoxypregna-4,6-diene-3,20-dione;
6 - fluoro - 11β-hydroxy-17α-difluoromethyl-21-acetoxypregna-4,6-diene-3,20-dione;
6 - fluoro - 11β-hydroxy-16α-methyl-17α-difluoromethyl-21-acetoxypregna-4,6-diene-3,20-dione;
6 - fluoro - 11β-hydroxy-16β-methyl-17α-difluoromethyl-21-acetoxypregna-4,6-diene-3,20-dione;
6 - methyl - 11β-hydroxy-17α-difluoromethyl-21-acetoxypregna-4,6-diene-3,20-dione;
9α - fluoro - 11β-hydroxy-17α-difluoromethyl-21-acetoxypregna-4,6-diene-3,20-dione;
9α - fluoro - 11β-hydroxy-16α-methyl-17α-difluoromethyl-21-acetoxypregna-4,6-diene-3,20-dione;
9α - fluoro - 11β-hydroxy-16β-methyl-17α-difluoromethyl-21-acetoxypregna-4,6-diene-3,20-dione;
6 - chloro - 9α-fluoro-11β-hydroxy-17α-difluoromethyl-21-acetoxypregna-4,6-diene-3,20-dione;
6 - chloro - 9α - fluoro-11β-hydroxy-16α-methyl-17α-difluoromethyl - 21-acetoxypregna-4,6-diene-3,20-dione;
6 - chloro - 9α-fluoro-11β-hydroxy-16β-methyl-17α-difluoromethyl - 21-acetoxypregna-4,6-diene-3,20-dione;
6,9α - difluoro - 11β-hydroxy-17α-difluoromethyl-21-acetoxypregna-4,6-diene-3,20-dione;
6,9α - difluoro - 11β-hydroxy-16α-methyl-17α-difluoromethyl-21-acetoxypregna-4,6-diene-3,20-dione;
6,9α - difluoro - 11β -hydroxy - 16β-methyl-17α-difluoromethyl-21-acetoxypregna-4,6-diene-3,20-dione; and
6 - methyl - 9α-fluoro-11β-hydroxy-17α-difluoromethyl-21-acetoxypregna-4,6-diene-3,20-dione.

The foregoing 21-acetoxy derivatives are converted to the corresponding free 21-hydroxy compounds through hydrolysis with potassium bicarbonate in the manner previously described.

*Example 8*

A mixture of 1 g. of 6-chloro-11β-hydroxy-17α-difluoromethyl - 21-acetoxypregna-4,6-diene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 6-chloro-11β-hydroxy-17α-difluoromethyl - 21 - acetoxypregna-1,4,6-triene-3,20-dione, which may be further purified through recrystallization from acetone:hexane.

In a similar fashion the following compounds, and upon basic hydrolysis their free 21-alcohols, are obtained:

11β - hydroxy - 17α - difluoromethyl-21-acetoxypregna-1,4,6-triene-3,20-dione;
11β - hydroxy-16α-methyl-17α-difluoromethyl-21-acetoxypregna-1,4,6-triene-3,20-dione;
11β - hydroxy - 16β - methyl - 17α-difluoromethyl-21-acetoxypregna-1,4,6-triene-3,20-dione;
6 - chloro - 11β-hydroxy-16α-methyl-17α-difluoromethyl-21-acetoxypregna-1,4,6-triene-3,20-dione;
6 - chloro - 11β-hydroxy-16β-methyl-17α-difluoromethyl-21-acetoxypregna-1,4,6-triene-3,20-dione;
6 - fluoro - 11β-hydroxy-17α-difluoromethyl-21-acetoxypregna-1,4,6-triene-3,20-dione;
6 - fluoro - 11β-hydroxy-16α-methyl-17α-difluoromethyl-21-acetoxypregna-1,4,6-triene-3,20-dione;
6 - fluoro - 11β-hydroxy-16β-methyl-17α-difluoromethyl-21-acetoxypregna-1,4,6-triene-3,20-dione;
6 - methyl - 11β-hydroxy-17α-difluoromethyl-21-acetoxypregna-1,4,6-triene-3,20-dione;
9α - fluoro - 11β-hydroxy-17α-difluoromethyl-21-acetoxypregna-1,4,6-triene-3,20-dione;
9α - fluoro - 11β-hydroxy-16α-methyl-17α-difluoromethyl-21-acetoxypregna-1,4,6-triene-3,20-dione;
9α - fluoro - 11β-hydroxy-16β-methyl-17α-difluoromethyl-21-acetoxypregna-1,4,6-triene-3,20-dione;
6 - chloro - 9α-fluoro-11β-hydroxy-17α-difluoromethyl-21-acetoxypregna-1,4,6-triene-3,20-dione;
6 - chloro - 9α - fluoro-11β-hydroxy-16α-methyl-17α-difluoromethyl - 21 - acetoxypregna - 1,4,6-triene-3,20-dione;
6 - chloro - 9α - fluoro-11β-hydroxy-16β-methyl-17α-difluoromethyl - 21 - acetoxypregna - 1,4,6-triene-3,20-dione;
6,9α - difluoro - 11β-hydroxy-17α-difluoromethyl-21-acetoxypregna-1,4,6-triene-3,20-dione;
6,9α - difluoro - 11β - hydroxy-16α-methyl-17α-difluoromethyl-21-acetoxypregna-1,4,6-triene-3,20-dione;
6,9α - difluoro - 11β - hydroxy-16β-methyl-17α-difluoromethyl - 21-acetoxypregna-1,4,6-triene-3,20-dione; and
6 - methyl - 9α - fluoro-11β-hydroxy-17α-difluoromethyl-21-acetoxypregna-1,4,6-triene-3,20-dione.

*Example 9*

A mixture of 0.5 g. of 11β-hydroxy-17α-difluoromethyl-21-acetoxypregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 11β-hydroxy-17α-difluoromethyl-21-acetoxypregna-1,4-diene-3,20-dione which is further purified by recrystallization from acetone:hexane.

One gram of 11β-hydroxy-17α-difluoromethyl-21-acetoxypregna-1,4-diene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 11β,21-dihydroxy-17α-difluoromethylpregna-1,4-diene-3,20-dione which is collected by filtration and recrystallized from acetone:hexane.

In a similar fashion, the following compounds are obtained:

11β,21 - dihydroxy - 16α - methyl-17α-difluoromethylpregna-1,4-diene-3,20-dione;
11β,21 - dihydroxy - 16β - methyl-17α-difluoromethylpregna-1,4-diene-3,20-dione;
6α - chloro - 11β,21 - dihydroxy - 17α-difluoromethylpregna-1,4-diene-3,20-dione;
6α - fluoro - 11β,21 - dihydroxy - 17α-difluoromethylpregna-1,4-diene-3,20-dione;
6α - methyl - 11β,21 - dihydroxy-17α-difluoromethylpregna-1,4-diene-3,20-dione;
6α - chloro - 9α - fluoro-11β,21-dihydroxy-17α-difluoromethylpregna-1,4-diene-3,20-dione;
6α,9α - difluoro - 11β,21-dihydroxy-17α-difluoromethylpregna-1,4-diene-3,20-dione;
6α - methyl - 9α - fluoro-11β,21-dihydroxy-17α-difluoromethylpregna-1,4-diene-3,20-dione;
6α - chloro - 9α - fluoro-11β,21-dihydroxy-16α-methyl-17α-difluoromethylpregna-1,4-diene-3,20-dione;
6α - chloro - 9α-fluoro-11β,21-dihydroxy-16β-methyl-17α-difluoromethylpregna-1,4-diene-3,20-dione;
6α,9α - difluoro - 11β,21-dihydroxy-16α-methyl-17α-difluoromethylpregna-1,4-diene-3,20-dione;
6α,9α - difluoro - 11β,21-dihydroxy-16β-methyl-17α-difluoromethylpregna-1,4-diene-3,20-dione;
9α - fluoro - 11β,21-dihydroxy-16α-methyl-17α-difluoromethylpregna-1,4-diene-3,20-dione;
9α - fluoro - 11β,21-dihydroxy-16β-methyl-17α-difluoromethylpregna-1,4-diene-3,20-dione; and
9α - fluoro - 11β,21 - dihydroxy - 17α-difluoromethylpregna-1,4-diene-3,20-dione.

Example 10

To a stirred solution of 1 g. of 11β-hydroxy-17α-difluoromethyl-21-acetoxypregn-4-ene-3,20-dione in 10 ml. of acetone, cooled to 0° C., is added under nitrogen a solution of 8N chromic acid (prepared by mixing 26 g. of chromium trioxide with 23 ml. of concentrated sulfuric acid and diluting with water to 100 ml.) until the color of the reagent persists in the mixture. The mixture is then stirred for five minutes at 0–5° C. and diluted with water. The solid which forms is collected by filtration, washed with water and dried under vacuum to yield 17α-difluoromethyl-21-acetoxypregn-4-ene-3,11,20-trione which may be further purified by recrystallization from acetone: hexane.

One gram of 17α-difluoromethyl-21-acetoxypregn-4-ene-3,11,20-trione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-difluoromethyl-21-hydroxypregn-4-ene-3,11,20-trione which is collected by filtration and recrystallized from acetone:hexane.

To a cooled solution (0° C.) of 3.4 g. of 17α-difluoromelhyt-21-hydroxypregn-4-ene-3,11,20-trione in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 17α-difluoromethyl-21-iodopregn-4-ene-3,11,20-trione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 17α-difluoromethyl-21-fluoropregn-4-ene-3,11,20- trione which is recrystallized from methanol:acetone.

In a similar fashion other 21-fluoro compounds of the present invention are prepared via the foregoing procedure. The 11-keto product may be converted to the corresponding 11α-hydroxy derivative through formation of the 3,20-bis semicarbazone, reduction as with sodium borohydride, and cleavage of the 3,20-bis semicarbazone with pyruvic or acetic acid.

Example 11

A mixture of 1 g. of 17α-difluoromethyl-21-iodopregn-4-ene-3,11,20-trione and 1.1 molar equivalents of silver monobasic phosphate in 60 ml. of acetonitrile is heated at reflux for two hours. The mixture is then filtered and evaporated to dryness to yield 17α-difluoromethyl-21-phosphateopregn-4-ene-3,11,20-trione which may be recrystallized from methanol:ethyl acetate. This product, dissolved in methanol, may be tritrated with aqueous sodium hydroxide to yield the corresponding monosodium and disodium salts.

Other 21-phosphato derivatives of the present invention may similarly be prepared according to the procedure of this example.

Example 12

A solution of 1 g. of 11β-hydroxy-17α-difluoromethyl-21-acetoxypregn-4-ene-3,20-dione in 50 ml. of tetrahydrofuran is added over a 30-minute period to a stirred suspension of 1 g. of lithium aluminum hydride in 50 ml. of anhydrous tetrahydrofuran, and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β,11β-dihydroxy - 17α - difluoromethyl-21-acetoxypregn-4-en-20-one which may be further purified through recrystallization from acetone:hexane.

In a similar fashion the other 3-keto-Δ⁴-enes of the present invention are converted to the corresponding 3β-hydroxy-Δ⁴-enes by utilization of the procedure of this example.

Example 13

A mixture of 1 g. of 3β,11β-dihydroxy-17α-difluoromethyl-21-acetoxypregn-4-ene-20-one, 4 ml. of pyridine and 2 ml. of acetic anhydride is allowed to stand at room temperature for 15 hours. The mixture is then poured into ice water and the solid which forms is collected by filtration, washed wtih water and dried to yield 3β,21-diacetoxy-11β-hydroxy-17α-difluoromethylpregn-4-en-20-one which may be further purified through recrystallization from acetone:hexane.

Likewise, the various 3β-hydroxy-Δ⁴-enes of the present invention, prepared according to the procedure of Example 9, may be esterified via the procedure of this example. Utilization of other anhydrides in this method, such as propionic anhydride, yields the corresponding 3β- acylates.

Example 14

Two milliliters of dihydropyran are added to a solution of 1 g. of 3β,11β-dihydroxy-17α-difluoromethyl-21-acetoxypregn-4-en-20-one in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqueous sodium carbonate solution and water, dried and evaporated. The residue is chromatographed on neutral alumina, eluting with hexane, to yield 3β-tetrahydropyranyloxy-11β-hydroxy - 17α - difluoromethyl-21-acetoxypregn-4-en-20-one which is recrystallized from pentane.

By employing the various 3β-hydroxy compounds of the present invention in the foregoing procedure, the corresponding 3β-tetrahydropyranyl ethers are obtained.

Example 15

Two milliliters of dihydropyran are added to a solution of 1 g. of 9α-fluoro-11β,21-dihydroxy-17α-difluoromethyl-pregna-4,6-diene-3,20-dione in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 9α-fluoro-11β-hydroxy-17α-difluoromethyl - 21 - tetrahydropyranyloxypregna-4,6-diene-3,20-dione which is recrystallized from pentane.

Utilization of the procedure of this example with the various other 21-hydroxy compounds of the present invention similarly yields the corresponding 21-tetrahydropyranyl ethers.

Example 16

To a stirred and refluxing solution of 1 g. of 9α-fluoro-11β-hydroxy - 17α - difluoromethyl-21-tetrahydropyranyloxypregna-4,6-diene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α, 7α-difluoromethylene-9α-fluoro-11β-hydroxy-17α-difluoromethyl - 21-tetrahydropyranyloxypregn-4-ene-3,20-dione.

To a solution of 1 g. of 6α,7α-difluoromethylene-9α-fluoro - 11β - hydroxy-17α-difluoromethyl-21-tetrahydropyranyloxypregn-4-ene-3,20-dione in 30 ml. of acetic acid is added 0.5 ml. of 2 N hydrochloric acid. The mixture is allowed to stand for five hours at room temperature and is then diluted with ice water and extracted with methylene chloride. The extracts are washed with water to neutrality, dried over sodium sulfate and evaporated to dryness to yield 6α,7α-difluoromethylene-9α-fluoro-11β,-21-dihydroxy-17α-difluoromethylpregn-4-ene-3,20 - dione which is recrystallized from acetone:hexane.

By subjecting other 4,6-dienes of the present invention to the foregoing procedures, the corresponding Δ⁴-6α,7α-difluoromethyl derivatives are obtained. These in turn may be subjected to the procedure of Example 9 to yield the respective $\Delta^{1,4}$-diene. Thus, the example, there are prepared:

6α,7α-difluoromethylene-9α-fluoro-11β,21-dihydroxy-17α-difluoromethylpregna-1,4-diene-3,20-dione;
6α,7α-difluoromethylene-11β,21-dihydroxy-17α-difluoromethylpregna-1,4-diene-3,20-dione;
6α,7α-difluoromethylene-9α-fluoro-11β,21-dihydroxy-16α-methyl-17α-difluoromethylpregna-1,4-diene-3,20-dione;
6α,7α-difluoromethylene-11β,21-dihydroxy-16α-methyl-17α-difluoromethylpregna-1,4-diene-3,20-dione;
and 6β-fluoro-6α,7α-difluoromethylene-11β,21-dihydroxy-17α-difluoromethylpregna-1,4-diene-3,20-dione.

What is claimed is:
1. Compounds of the formula:

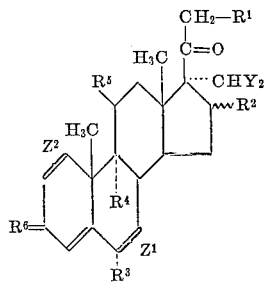

wherein:

$R^1$ is hydroxy, a hydrocarbon carboxylic acyloxy group of less than 12 carbon atoms, fluoro, phosphato, or tetrahydropyranyloxy;
$R^2$ is hydrogen or methyl;
$R^3$ is hydrogen, chloro, fluoro or methyl;
$R^4$ is hydrogen or fluoro;
$R^5$ is β-hydroxy or keto;
$R^6$ is an oxygen atom or the group

in which
$R^7$ is hydrogen, tetrahydropyranyl or a hydrocarbon carboxylic acyl group of less than 12 carbon atoms;
$Z^1$ is a carbon-carbon double bond, a carbon-carbon single bond or the difluoromethylene group

$Z^2$ is a carbon-carbon single bond or a carbon-carbon double bond, $Z^2$ being a carbon-carbon single bond when $R^6$ is other than an oxygen atom; and
Y is chloro or fluoro.

2. Compounds according to claim 1 wherein $R^1$ is hydroxy or acetoxy;
$R^3$ is hydrogen or fluoro;
$R^5$ is β-hydroxy;
$R^6$ is an oxygen atom;
$Z^1$ is a carbon-carbon single bond;
$Z^2$ is a carbon-carbon double bond;
Y is fluoro; and
$R^2$ and $R^4$ are as therein defined.

3. Compounds according to claim 2 wherein $R^2$, $R^3$ and $R^4$ are hydrogen.
4. Compounds according to claim 2 wherein $R^2$ is α-methyl, $R^3$ is hydrogen and $R^4$ is fluoro.
5. Compounds according to claim 2 wherein $R^2$ is α-methyl, and $R^3$ and $R^4$ are fluoro.
6. Compounds according to claim 2 wherein $R_2$ is α-methyl, $R^3$ is fluoro and $R^4$ is hydrogen.
7. Compounds according to claim 1 wherein $R^1$ is hydroxy or acetoxy;
$R^3$ is hydrogen or fluoro;
$R^5$ is β-hydroxy;
$R^6$ is an oxygen atom;
$Z^1$ is the difluoromethylene group

$Z^2$ is a carbon-carbon double bond;
Y is fluoro; and
$R^2$ and $R^4$ are as therein defined.

8. Compounds according to claim 7 wherein $R^2$, $R^3$ and $R^4$ are hydrogen.
9. Compounds according to claim 7 wherein $R^2$ is α-methyl, and $R^3$ and $R^4$ are hydrogen.
10. Compounds according to claim 7 wherein $R^2$ is α-methyl, $R^3$ is hydrogen and $R^4$ is fluoro.
11. Compounds according to claim 1 wherein $R^1$ is hydroxy or acetoxy;
$R^3$ is hydrogen or fluoro;
$R^5$ is β-hydroxy;
$R^6$ is an oxygen atom;
$Z^1$ is a carbon-carbon single bond;
$Z^2$ is a carbon-carbon single bond;
Y is fluoro; and
$R^2$ and $R^4$ are as therein defined.

12. Compounds according to claim 11 wherein $R^2$, $R^3$ and $R^4$ are hydrogen.
13. Compounds according to claim 11 wherein $R^2$ is α-methyl, $R^3$ is hydrogen and $R^4$ is fluoro.
14. Compounds according to claim 11 wherein $R^2$ is α-methyl and $R^3$ and $R^4$ are fluoro.
15. Compounds according to claim 11 wherein $R^2$ is α-methyl, $R^3$ is fluoro and $R^4$ is hydrogen.

References Cited

UNITED STATES PATENTS 3,287,356  11/1966  Arth et al. _____ 260—239.55

ELBERT L. ROBERTS, *Primary Examiner.*

UNITED STATES PATENT OFFICE
CERTIFICATE OF CORRECTION

Patent No. 3,370,072                      February 20, 1968

John H. Fried

It is hereby certified that error appears in the above numbered patent requiring correction and that the said Letters Patent should read as corrected below.

Column 3, line 30, for "one" read -- ene --; column 6, line 55, for "3β" read -- 3α --; line 63, after "dihydroxy" insert -- 17α---; column 13, line 26, for "melhyt" read -- methyl --; line 48, for "11α" read -- 11β --; column 15, line 15, for "of" read -- to --; line 18, for "the" second occurrence, read -- for --.

Signed and sealed this 13th day of May 1969.

(SEAL)
Attest:

Edward M. Fletcher, Jr.
Attesting Officer

Commissioner of Patents